(12) United States Patent
Woods et al.

(10) Patent No.: US 11,240,673 B2
(45) Date of Patent: Feb. 1, 2022

(54) REAL TIME SPECTRUM ACCESS POLICY BASED GOVERNANCE

(71) Applicant: ANDRO Computation Solutions, Rome, NY (US)

(72) Inventors: Timothy Otis Woods, Cicero, NY (US); Joseph McCoy, Frankfort, NY (US); Andrew Louis Drozd, Rome, NY (US); Christopher Dean Maracchion, Rome, NY (US); Sean Robert Furman, Sherrill, NY (US); John James Hrabik, Canastota, NY (US)

(73) Assignee: ANDRO COMPUTATIONAL SOLUTIONS, Rome, NY (US)

( * ) Notice: Subject to any disclaimer, the term of this patent is extended or adjusted under 35 U.S.C. 154(b) by 0 days.

(21) Appl. No.: 16/953,636

(22) Filed: Nov. 20, 2020

(65) Prior Publication Data
US 2021/0153030 A1    May 20, 2021

Related U.S. Application Data

(60) Provisional application No. 62/938,024, filed on Nov. 20, 2019.

(51) Int. Cl.
*H04W 16/14*    (2009.01)
*H04W 48/18*    (2009.01)
(Continued)

(52) U.S. Cl.
CPC ......... *H04W 16/14* (2013.01); *H04W 28/24* (2013.01); *H04W 48/18* (2013.01); *H04W 72/10* (2013.01); *H04W 72/1231* (2013.01)

(58) Field of Classification Search
None
See application file for complete search history.

(56) References Cited

U.S. PATENT DOCUMENTS

| | | |
|---|---|---|
| 8,326,313 B2 | 12/2012 | McHenry et al. |
| 8,503,383 B2 | 8/2013 | Hu et al. |
| | (Continued) | |

FOREIGN PATENT DOCUMENTS

WO    2017021773 A1    2/2017

OTHER PUBLICATIONS

International Search Report and Written Opinion dated Mar. 3, 2021 for PCT/US2020/061483 filed Nov. 20, 2020; pp. 13.

*Primary Examiner* — Thinh D Tran
(74) *Attorney, Agent, or Firm* — Hoffman Warnick LLC

(57) ABSTRACT

Embodiments herein provide a method for admitting devices to a special access frequency band of a wireless communication network, including: detecting an access request to communicate via the network, the network including at least one priority device communicating via the special access frequency band of the network, wherein the access request is generated by a non-priority device; evaluating whether a portion of the special access frequency band of the network is available for use by the non-priority device, based on communication settings of the non-priority device; transmitting a governing instruction to the non-priority device in response to the portion of the special access frequency band of the network being available for use by the non-priority device; and denying the access request in response to the portion of the special access frequency band of the network not being available for use by the non-priority device.

23 Claims, 4 Drawing Sheets

(51) Int. Cl.
  *H04W 72/12* (2009.01)
  *H04W 72/10* (2009.01)
  *H04W 28/24* (2009.01)

(56) References Cited

U.S. PATENT DOCUMENTS

| | | | |
|---|---|---|---|
| 8,699,430 B2 | 4/2014 | Chandramouli et al. | |
| 8,717,929 B2 | 5/2014 | Smith et al. | |
| 9,094,781 B2 | 7/2015 | Wang et al. | |
| 9,986,577 B2 | 5/2018 | Bose | |
| 10,111,243 B2 | 10/2018 | Mitola, III et al. | |
| 10,165,450 B2 | 12/2018 | Taher et al. | |
| 10,212,706 B2 | 2/2019 | Malladi et al. | |
| 2012/0302190 A1* | 11/2012 | McHenry | H04B 17/345 455/226.3 |
| 2014/0237547 A1* | 8/2014 | Bose | H04W 72/082 726/3 |
| 2016/0104499 A1* | 4/2016 | Hashimoto | G10L 21/0388 381/58 |
| 2016/0212624 A1* | 7/2016 | Mueck | H04W 72/10 |
| 2017/0078492 A1* | 3/2017 | Schmidt | H04W 16/14 |
| 2017/0238136 A1* | 8/2017 | Smith | H04W 4/021 455/456.3 |
| 2017/0314952 A1* | 11/2017 | Moriguchi | G01C 21/3629 |
| 2018/0132241 A1* | 5/2018 | Gayde | H04B 17/318 |
| 2018/0192295 A1* | 7/2018 | Mueck | H04W 74/04 |
| 2019/0081690 A1* | 3/2019 | Mueck | H04W 52/243 |
| 2019/0132853 A1* | 5/2019 | Mitola, III | H04M 15/8235 |
| 2019/0150134 A1* | 5/2019 | Kakinada | H04L 67/125 370/330 |
| 2019/0215698 A1* | 7/2019 | Balachandran | H04W 72/0453 |
| 2019/0223037 A1* | 7/2019 | Raghothaman | H04W 24/10 |
| 2019/0230675 A1* | 7/2019 | Papa | H04W 16/00 |
| 2020/0028561 A1* | 1/2020 | Leulescu | H04B 7/022 |
| 2020/0059795 A1* | 2/2020 | Kakinada | H04W 16/14 |
| 2020/0059931 A1* | 2/2020 | Hannan | H04W 72/0453 |
| 2020/0077457 A1* | 3/2020 | Sevindik | H04W 76/15 |
| 2020/0236631 A1* | 7/2020 | Karimli | H04W 52/244 |
| 2020/0252124 A1* | 8/2020 | Smyth | H04W 16/14 |
| 2020/0260291 A1* | 8/2020 | Markwart | H04W 12/06 |
| 2020/0275355 A1* | 8/2020 | Dhillon | H04W 48/16 |
| 2020/0284915 A1* | 9/2020 | Hamzeh | H04J 11/0073 |
| 2020/0351989 A1* | 11/2020 | Ahmet | H04W 12/03 |
| 2020/0382963 A1* | 12/2020 | Mueck | H04W 88/08 |
| 2021/0007137 A1* | 1/2021 | Abouelseoud | H04W 74/0808 |

* cited by examiner

REAL TIME SPECTRUM ACCESS POLICY BASED GOVERNANCE

BACKGROUND

1. Technical Field

Embodiments of the present disclosure pertain to governing a spectrum access policy in real time. More specifically, embodiments of the disclosure provide a system and method for continuous enforcement of a spectrum access policy to control and monitor access to selected frequency bands by various users in real time.

2. Background Art

Current mobile communication devices have the ability to use Federal Communications Commission (FCC) licensed and unlicensed spectrum bands to exchange data. Various communication devices may access one or more spectrum bands via user initiated communication, application initiated communication, service initiated communication, and/or system initiated communication between the device(s) and a Radio Access Network (RAN). To encourage the development and use of new device and/or networking technologies, some spectrum bands are designated as "special access" bands. One type of special access frequency band is the FCC Innovation Band, currently in the named Citizens Broadband Radio Service (CBRS) 3.5 gigahertz (GHz) spectrum. The Innovation Band requires incumbent users to maintain priority of new commercial uses and various other special access frequency bands may impose similar requirements.

Ensuring continued priority for desired uses in a special access frequency band has been a technical challenge. In the example of the Innovation Band, the FCC requires any device communicating in this band to report to a spectrum management service which monitors the use of the Innovation Band. The spectrum management service is responsible for local approval of the new Primary Access Users (PAL), with the expectation of ensuring priority to approved incumbent users. In this system, however, the PAL must report upon deployment various details including the device location and radio frequency (RF) parameters to the spectrum management service via a network, e.g., using the internet. The spectrum management service provides a set of RF operational parameters selected to avoid interfering with any local incumbent operator's use of the spectrum. Such exchanges do not occur in real time. In one example, it may take as long as twenty-four hours for the spectrum management service to provide updates in response to a request.

Resulting disadvantages may include, e.g., inefficiency of the special access frequency band because the incumbent's actual time of use, and any risk of interruption by new users, because all use of the special access frequency band is brokered by the spectrum management service. This paradigm also precludes the use of mobile or autonomous systems (e.g., drones, robots, vehicles, etc.) which must be able to access and use a desired communication band in real time. Additionally, intermittent verifying of special access band use is inconsistent with Department of Defense (DoD) test range frequency-based systems of telemetry, the global positioning system (GPS,) and counter-drone technology. Such technology relies on real-time management through various other regulatory entities, e.g., Federal Aviation Administration (FAA) Area Frequency Coordinators.

SUMMARY

The illustrative aspects of the present disclosure are designed to solve the problems herein described and/or other problems not discussed.

A first aspect of the present disclosure provides a method for admitting devices to a special access frequency band of a wireless communication network. The method may include: detecting an access request to communicate via the wireless communication network, the wireless communication network including at least one priority device communicating via the special access frequency band of the wireless communication network, wherein the access request is generated by a non-priority device; evaluating whether a portion of the special access frequency band of the wireless communication network is available for use by the non-priority device, based on communication settings of the non-priority device; transmitting a governing instruction to the non-priority device in response to the portion of the special access frequency band of the wireless communication network being available for use by the non-priority device; and denying the access request in response to the portion of the special access frequency band of the wireless communication network not being available for use by the non-priority device.

A second aspect of the present disclosure provides a system including: at least one priority device configured to communicate via a special access frequency band of a wireless communication network; a network controller communicatively coupled to the at least one priority device, wherein the network controller is configured to: detect an access request to communicate via the wireless communication network, wherein the access request is generated by a non-priority device; evaluate whether a portion of the special access frequency band of the wireless communication network is available for use by the non-priority device, based on communication settings of the non-priority device; transmit a governing instruction to the non-priority device in response to the portion of the special access frequency band of the wireless communication network being available for use by the non-priority device; and deny the access request in response to the portion of the special access frequency band of the wireless communication network not being available for use by the non-priority device.

A third aspect of the present disclosure provides a method for decentralized governance of a special access frequency band of a wireless network, the method including: detecting, via at least one device included within a non-regulatory level of the wireless communication network, an access request to communicate via the special access frequency band of the wireless communication network, wherein the access request is generated by a non-priority device lacking authorization in a regulatory level of the wireless communication network; evaluating, via the at least one device, whether a portion of the special access frequency band of the wireless communication network is available for use by the non-priority device, based on communication settings of the non-priority device; transmitting a governing instruction to the non-priority device in response to the portion of the special access frequency band of the wireless communication network being available for use by the non-priority device, wherein the governing instruction is not generated by the regulatory level of the wireless communication network; and denying the access request, via the at least one device, in response to the portion of the special access frequency band of the wireless communication network not being available for use by the non-priority device.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
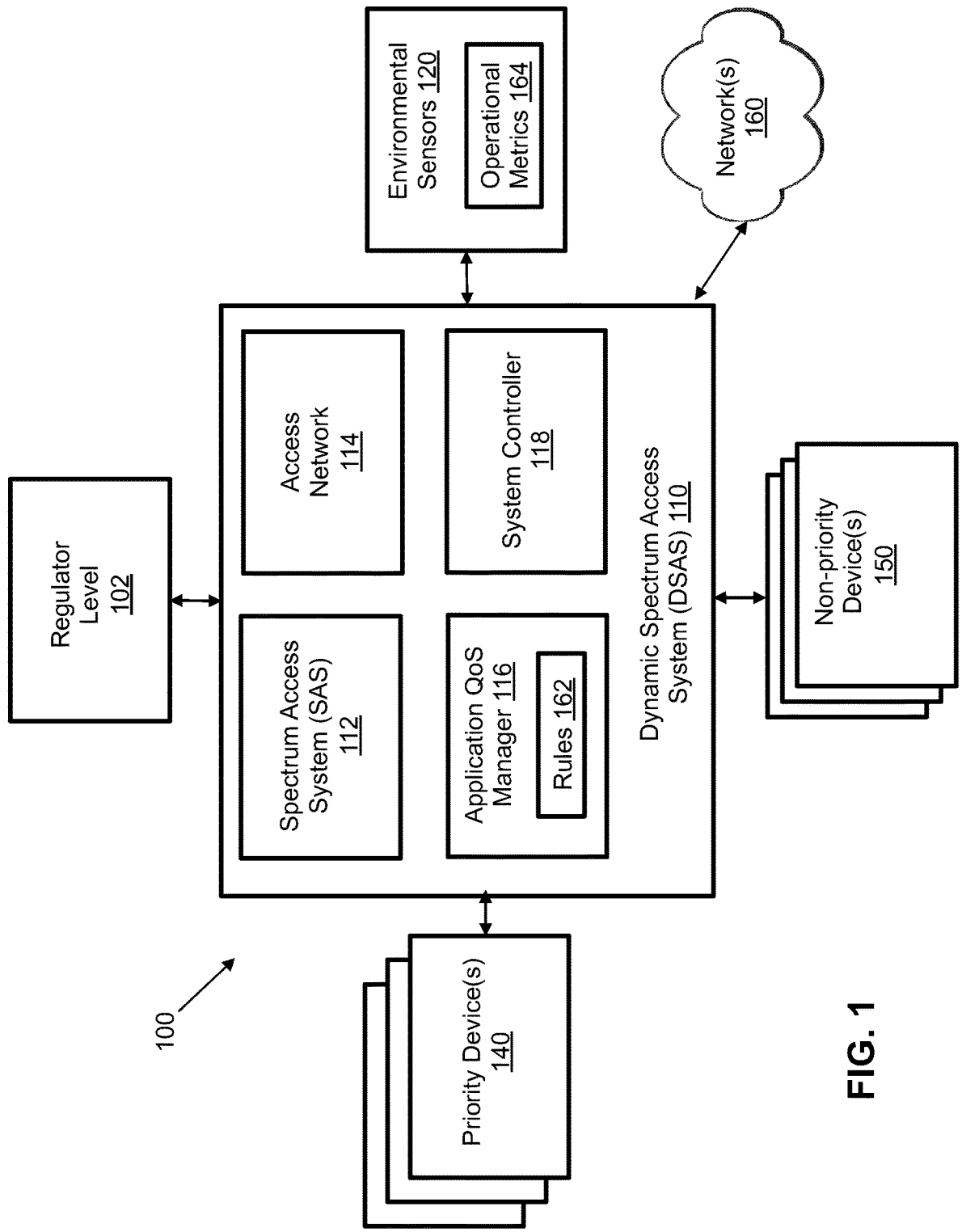
FIG. 1 shows a schematic view of a system according to embodiments of the disclosure.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Embodiments of the disclosure implement various features from U.S. patent application Ser. No. 16/548,030, entitled "ADJUDICATION OF ACCESS POLICIES IN WIRELESS DEVICE NETWORK" and hereby incorporated by reference. That application provides features including, e.g., an immutable high-speed low labor data path from high-level regulators to network-level and device-level administrators using ledger-based and/or blockchain technology.

Embodiments of the disclosure provide a system and method for electromagnetic spectrum sensing, and device (e.g., radio unit) interaction, such that devices seeking to communicate over a special access frequency band are made aware of the presence and operation of priority devices. Furthermore, embodiments of the disclosure may provide non-priority devices with governing instructions on how to communicate in a network via the special access frequency band in cooperation with incumbent priority devices. Continued access to the special access frequency band of the network may be contingent upon operation in compliance with the governing instructions. Further embodiments may provide a direct beacon via priority devices on a network, e.g., to facilitate such interaction. In this manner, various embodiments of the disclosure may provide decentralized governance of a special access frequency band of a wireless network, e.g., via devices that operate independently of a regulatory level. Embodiments of the disclosure can provide non-priority devices with repeated algorithmic determinations of which portions of the special access frequency band are available for use, in real time. In doing so, the need for outward reporting and subsequent interaction with third parties and/or network level administrators does not preclude autonomous real time systems and improves the spectrum use efficiency within the special access frequency band. The lack of outward reporting and subsequent interaction with third parties or network level administrators may constitute a form of decentralized governance for the wireless network. During operation, embodiments of the disclosure can provide multiple levels of priority and usage coordination and thereby implement-decentralized government of special access frequency bands.

Referring to FIG. 1, embodiments of the disclosure provide a system 100 and related method to achieve real-time governance of special access frequency bands in a wireless network. Embodiments of the disclosure may provide a dynamic spectrum access system with the ability to adjudicate, in real time, whether non-priority devices may operate on the network concurrently with one or more priority devices, and instructions for operating the non-priority devices in cases where they have been admitted. As discussed herein, the dynamic spectrum access system may operate independently of regulatory entities such as governing agencies and/or third parties to decentralize the admitting and denying of requests to operate via the special access frequency band.

The system 100 may include multiple levels of network functionality. For example, the system 100 may include a regulatory level 102 including one or more regulatory bodies, for example Federal Communications Commission (FCC), National Telecommunications and Information Administration (NTIA), one or more third party entities, and/or other entities responsible for governing communication across various frequency bands.

The system 100 as described herein may also be operable for use in networks with distinct operating parameters or requirements, e.g., defense applications. Specifically, embodiments of the system 100 are operable for Department of Defense (DoD) test range frequency-based systems of telemetry, the global positioning system (GPS), and/or counter-drone applications. In such applications, the system 100 allows for continuous verification in compliance with requirements of regulatory entities, e.g., the Federal Aviation Administration (FAA), but without centralized control and governance by the agencies responsible for such requirements.

One or more entities in regulator level 102 may designate a range of frequencies as a "special access" frequency band where particular operators and/or functions have prioritized access to a range of frequencies for implementing various functions. In conventional systems, third party entities such as those in the regulator level 102 would be responsible for determining which entities and/or devices may communicate via the special access frequency band, and may require authorization before new devices and/or entities are admitted to a network.

The system 100 may also include a dynamic spectrum access system (DSAS) 110 for centralized mid-level management and governance of a wireless communication network 160 (or multiple wireless communication networks 160 is some embodiments). The DSAS 110 may be embodied as, e.g., a computing device, control assembly, and/or other device for managing and/or brokering the admission and operation of various devices (e.g. radio units) within the wireless communication network 160. The DSAS 110 may augment conventional network topology by providing distributed and dynamic policy-based coordination of a flexible network topology and its associated devices. The DSAS 110 provides a dynamic interconnect between the devices (e.g., priority devices 140, non-priority devices 150), operational metrics 164 obtained via a set of environmental sensors 120, and regulatory authorities (e.g., in the regulator level 102). According to embodiments, the DSAS 110 may be sensor agnostic and may utilize operational metrics that are available. A typical sensor 120 may include, for example, an RF device. In general, the sensors 120 provide operational metrics that generally describe the networks spectrum profile including metrics such as channel availability and spectrum usage.

The DSAS 110 may be subdivided into various components for implementing respective functions. For instance, the DSAS 110 may include a spectrum access system (SAS) 112 for interfacing with various devices via an access network 114. The access network 114 may be different from the wireless communication network 160 administered by DSAS 110, and may be a distinct communications network and/or channel by which devices seek to access the special access frequency band via the DSAS 110. The SAS 112 of the DSAS 110 may be capable of distinguishing between previously-authorized devices (e.g., priority devices 140 discussed herein) and new devices which connect to the DSAS 110 via the access network 114 (e.g., non-priority devices 150 discussed herein).

The DSAS 110 may further include an application quality of service (QoS) manager 116 configured to track and provide inputs to the DSAS 110 to ensure one or more devices (e.g., priority device(s) 140 and/or non-priority device(s) 150) have the necessary bandwidth and throughput needed to meet application needs in real-time. The QoS manager 116 thus may provide a set of rules 162 governing the operation of priority device(s) 140 and/or non-priority device(s) 150. Such rules 162 may include, for example, a spectrum usage schema defining the bounds of device operation and associated priority schema.

The DSAS 110 may also include a system controller 118 responsible for independently managing the wireless communication network 160, and ensuring that any links established and continued within the wireless communication network 160 remain compliant with standards set by QoS manager 116 (e.g., in accordance with the set of rules 162). The DSAS 110 may be in communication with environmental sensors 120 configured to evaluate various operational metrics 164 concerning the wireless communication network 160. Where applicable, such operational metrics 164 may be provided to the application QoS manager 116 and/or the system controller 118 to further affect calculations and/or determinations implemented via these components.

During operation, each entity and/or component illustrated in the system 100 (e.g., regulator level 102, DSAS 110, environmental sensors 120, priority device(s) 140, non-priority device(s) 150, and/or other applicable entities or components) may remain in data communication with each other to implement one or more of the various features discussed herein.

Figure 2:
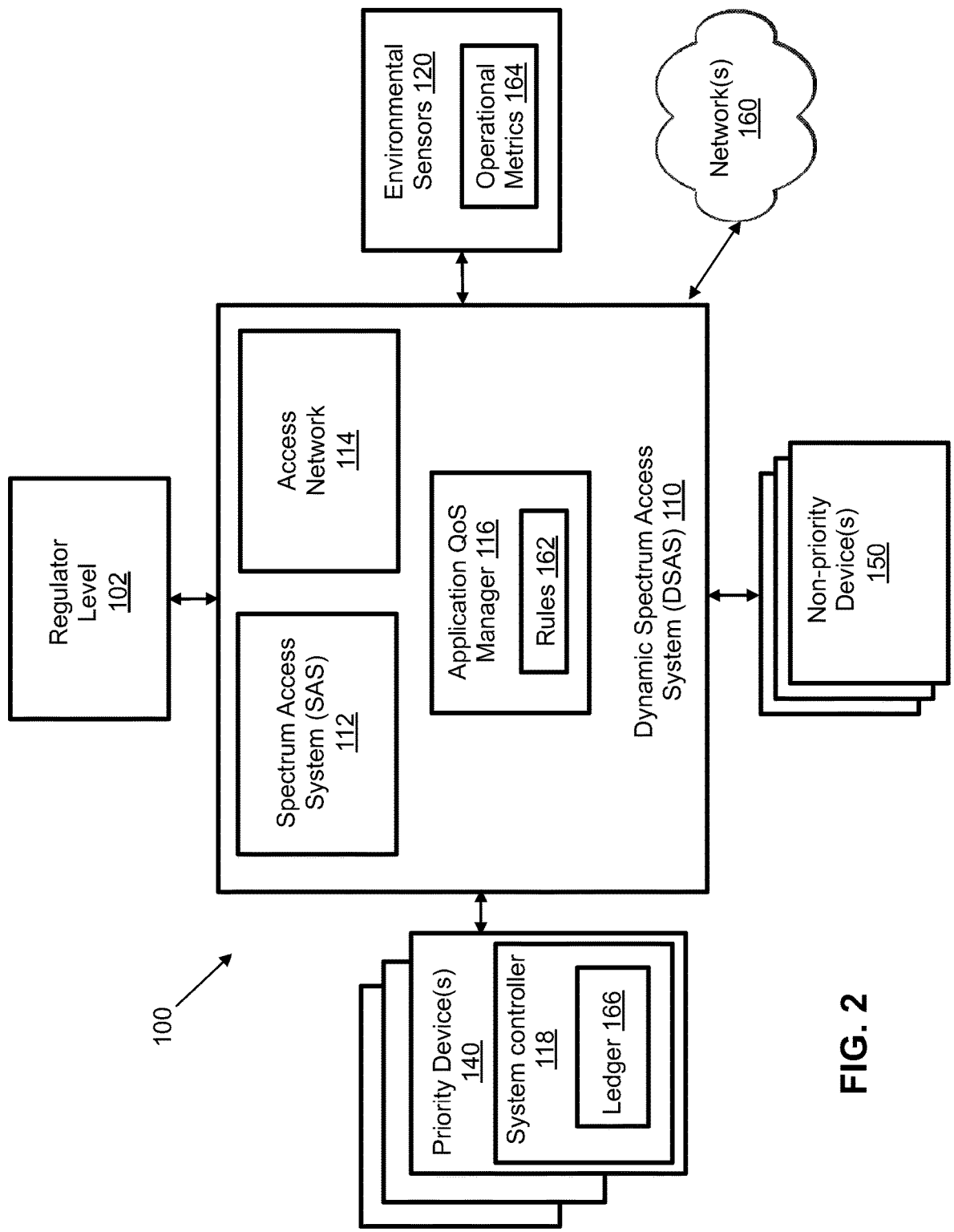
FIG. 2 shows a schematic view of a system with a network controller integrated with at least one priority device according to embodiments of the disclosure.

Referring briefly to FIG. 2, further embodiments of the disclosure may implement one or more subcomponents of the DSAS 110 directly on the priority device(s) 140. For example, the priority device(s) 140 may include an embodiment of the system controller 118 thereon. In this case, the priority device(s) 140 may be capable of directly communicating with non-priority device(s) 150 and/or the DSAS 110 to adjudicate whether one or more non-priority device(s) 150 will be permitted to use any portion of a special access frequency band of the wireless communication network 160. Thus, in some embodiments, system 100 may be implemented solely using a combination of the priority device(s) 140 with system controller 118 thereon, and conventional or other networking hardware implementing an embodiment of the DSAS 110. In such cases, multiple priority device(s) 140 (e.g., dozens, hundreds, or even thousands of device units) may provide the hardware infrastructure for granting or denying access to non-priority device(s) 150 to the special access frequency band on the wireless communication 160 network, without requiring consistent intervention or involvement by entities within regulator level 102 and/or other entities. Moreover, the parallel operation of multiple system controllers 118 on multiple priority devices 140 may provide redundancy within the wireless communication network 160 and thus may increase the fault tolerance of the wireless communication network 160. To prevent parallel operation by non-priority device(s) 150 on the special access frequency band, each system controller 118 may operate at least partially based on a distributed ledger 166 of past requests to access the wireless communication network 160. Such a ledger 166 may be propagated across system controller(s) 118 and/or priority device(s) 140 to ensure that governing instructions are generated and enforced consistently.

Figure 3:
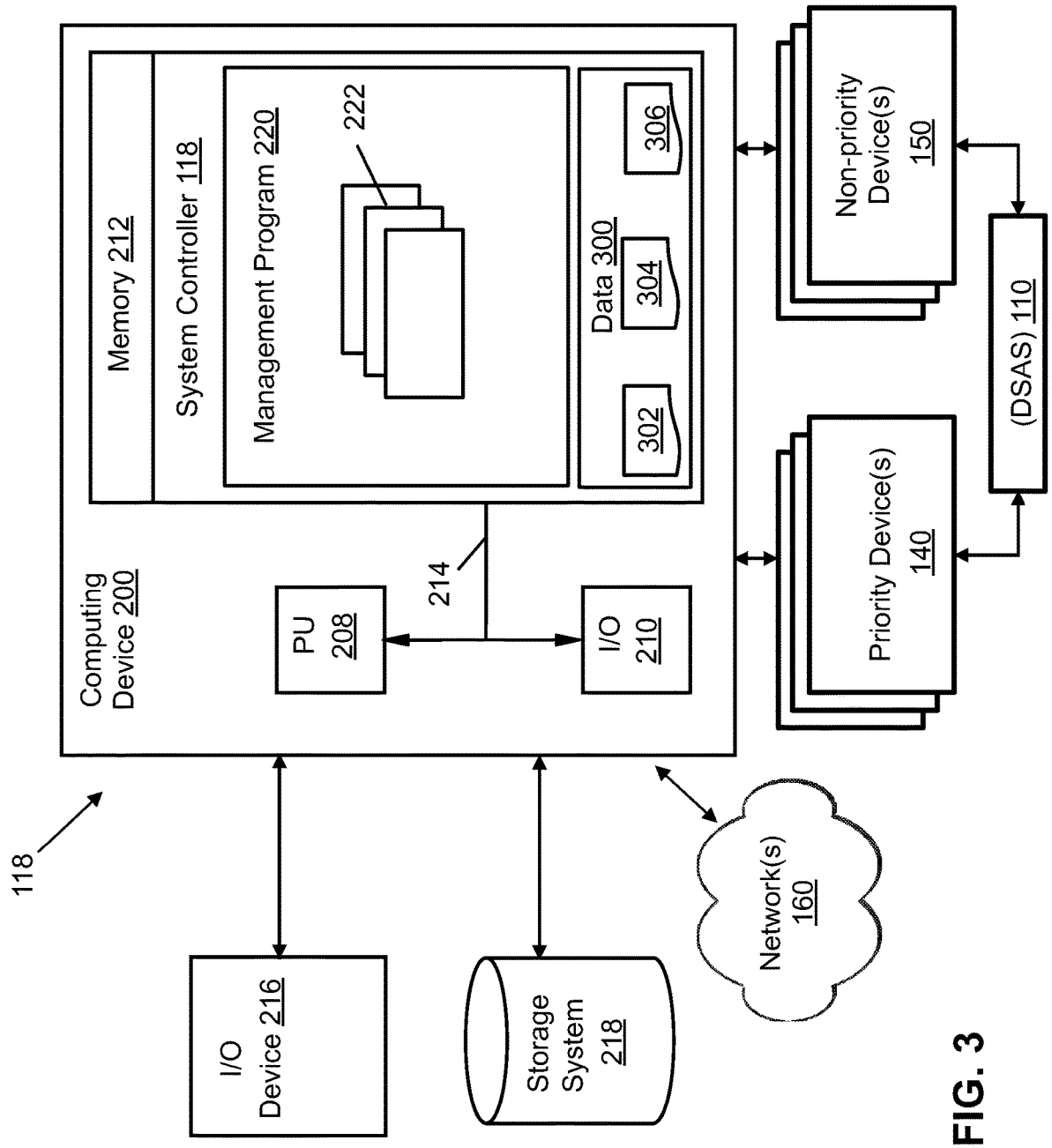
FIG. 3 shows an illustrative environment for providing a system according to embodiments of the disclosure.

Turning to FIG. 3, embodiments of the system controller 118 may be implemented through the use of a computing device 200. The computing device 200 may be integrated into the DSAS 110, priority device(s) 140, and/or other components described herein, or may be an independent component connected to one or more devices/components within the wireless communication network 160. The computing device 200 is shown connected to the priority device(s) 140 and the non-priority device(s) 150 in the example embodiment shown in FIG. 3.

As discussed herein, the computing device 200 may be operable to implement decentralized management of the wireless communication network 160, without direct aid or intervention by third parties and/or regulatory bodies. The computing device 200 may include a processor unit (PU) 208, an input/output (I/O) interface 210, a memory 212, and a bus 214. Further, the computing device 200 is shown in communication with an external I/O device 216 and a storage system 218. The external I/O device 216 may be embodied as any component allowing user interaction with the computing device 200. The system controller 118 may be included wholly or partially within the memory 212 of the computing device 200.

The system controller 118 can execute a management program 220, which in turn can include various modules 222, e.g., one or more software components configured to perform different actions, including without limitation: a calculator, a determinator, a comparator, etc. The modules 222 can implement any currently known or later developed analysis technique for adjudicating whether to permit or deny access of non-priority device(s) 150 to a wireless communication network 160. As shown, the computing device 200 may be in communication with priority device(s) 140 for sending and/or receiving various forms of data to implement the functions of the system controller 118. Thus, the computing device 200 in some cases may operate as a part of each priority device 140, while in other cases the same computing device 200 may be an intermediate component of the DSAS 110.

The modules 222 of the system controller 118 can use calculations, look up tables, and similar tools stored in the memory 212 for processing, analyzing, and operating on data to perform their respective functions. In general, the PU 208 can execute computer program code, such as the management program 220, which can be stored in the memory 212 and/or the storage system 218. The memory 212 and/or the storage system 218 thus may represent any suitable memory or storage device (internal, external, cloud-based, and so on) on and/or associated with the system controller 118 and may be configured to be interacted with by a user of the system controller 118 for providing communication capabilities and/or information to the user, e.g., via the I/O interface 210 and/or various I/O controllers. While executing computer program code, the PU 208 can read and/or write data to or from the memory 212, the storage system 218, and/or the I/O interface 210. The bus 214 can provide a communications link between each of the components in the computing device 200. The I/O device 216 can comprise any device that enables a user to interact with the computing device 200 or any device that enables the computing device 200 to communicate with the components described herein and/or other computing devices. The I/O device 216 (including but not limited to keyboards, displays, pointing devices, etc.) can be coupled to the priority device(s) 140 and/or the non-priority device(s) 150 either directly or through intervening I/O controllers (not shown).

The memory 212 can include a cache of data 300 organized for reference by the system controller 118. As discussed elsewhere herein, the computing device 200 can send, receive, and/or rely various types of data 300, including metadata pertaining to other devices/components of the system 100. The data 300 thus may be classified into multiple fields and, where desired, sub-fields within each field of data 300. The data 300 may be provided to and/or from priority device(s) 140, non-priority device(s) 150, e.g., via a network (e.g., access network 114) and/or an I/O device 216. To exchange data between multiple devices within the network, the computer system 200 may be communicatively connected to one or more devices, communication services, and/or wireless network interfaces. In some cases, these communication features may also be contained within the memory 212 of the computer system 200.

The data 300 can optionally be organized into a group of fields. In some cases, the data 300 may include various fields indicative of requirements for being admitted to, and operating within, the wireless communication network 160 after non-priority device(s) 150 is/are admitted thereto. For example, the data 300 may include information regarding special access frequency band(s) of the wireless communication network 160, for example, available frequencies, bandwidths, power consumption characteristics, signal modulations, packet overhead, other waveform properties, etc. In an example embodiment, the memory 212 may include a blockchain for storing spectrum profile metadata 302. The data 300 may also include transaction metadata 304 including, e.g., spatial, temporal, spectral, and security characteristics of the wireless communication network 160. In an example embodiment, the DSAS 110 may include a distributed ledger 166 (FIG. 2) configured to store the transaction metadata 304 within the memory 212. The data 300 may also include regulatory and stakeholder metadata (simply "regulatory metadata" hereafter) 306 including, e.g., various types of information provided by and/or within regulator level 102 such as access rules and/or decisions, user requirements, and others.

Each type of data 300, however embodied, may be accessible to the management program 220. The data 300 may be mixed and parsed using the management program 220 as it interfaces with a local static database, e.g., via the internet, to store regulatory and stakeholder access decisions. Such decisions may remain available to the management program 220 as data 300, which may be used for reference to generate governing instructions without direct input or involvement by regulatory agencies or third parties (e.g., via the regulator level 102). The management program 220 thus may output spectrum access rules directly to priority device(s) 140 and/or non-priority device(s) 150, and may permit regulatory and stakeholder validation feedback triggers via internet communication.

According to embodiments, regulatory requirements may be digitized into automated machine-readable code and stored in some combination of centralized, decentralized, and/or distributed memory locations that are available to the system 100 at the regulator level 102. At system startup, the regulatory requirements (e.g., initial regulatory requirements) may be pushed as a service to the system 100. The DSAS 110 may operate under a request-reply schema to ensure the most recent regulatory requirements are established across the system 100 to match the real-time description of the regulatory requirements at the regulator level 102. If changes are made to the regulatory requirements at the regulator level 102, such changes may be pushed (e.g., automatically) to the system 100. If a spectrum conflict occurs between priority and/or non-priority devices 140, 150, the system 100 may send a request to the regulator level 102 for resolution of the spectrum conflict.

Figure 4:
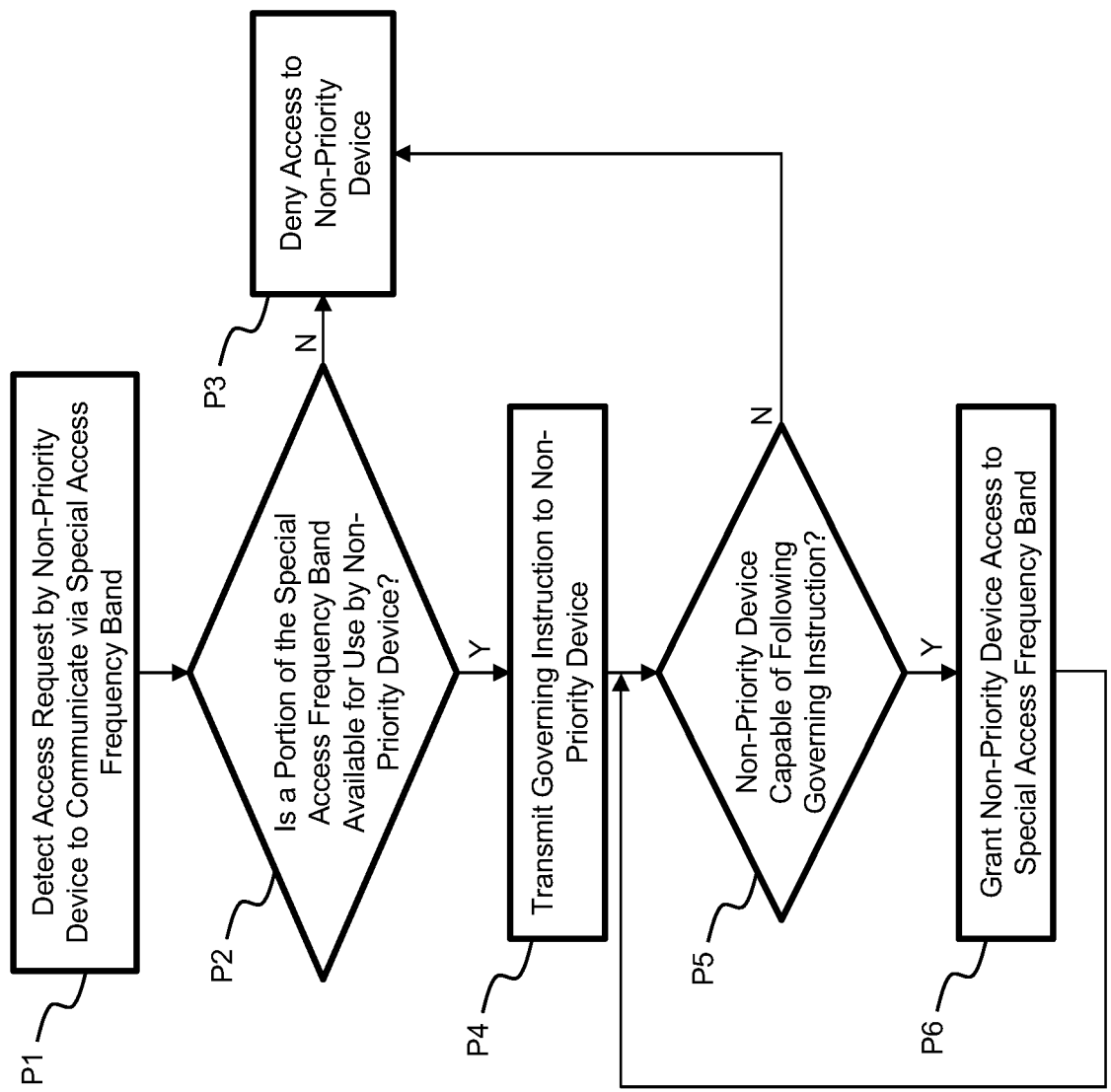
FIG. 4 is a flow diagram of a process according to embodiments of the disclosure.

Referring now to FIG. 4 and with further reference to FIGS. 1-3, embodiments of the system 100 may also be used to implement various methods according to embodiments of the disclosure. According to an example, such a method may be operable to admit or deny access by non-priority device (s) 150 to a wireless communication network 160 operating over a special access frequency band. At process P1, the method may include detecting, e.g., using DSAS 110 and/or priority device(s) 140, an access request by a non-priority device 150 to communicate via the special access frequency band of the wireless communication network 160. Continued processing may include, e.g., at process P2, determining via the system controller 118, and/or other components of the wireless communication network 160 not included in a regulatory body or third party (e.g., not part of regulator level 102), whether at least a portion of the special access frequency band of the wireless communication network 160 is available for use by the requesting non-priority device 150. The evaluation may be at least partially based on communication settings of the non-priority device 150, which may be stored in the memory 212 as data 300.

In cases where the special access frequency band of the wireless communication network is not available for use by the non-priority device 150 (N at process P2), flow passes to process P3 and access to the special access frequency band of the wireless communication network 160 is denied. In cases where it is possible to admit the non-priority device 150 to the special access frequency band of the wireless communication network 160 (Y at process P2), the DSAS 110 and/or priority device(s) 140 may transmit a governing instruction to the non-priority device 150 at process P4. The governing instruction may include, e.g., a predetermined operating frequency and/or other parameters which must be satisfied to avoid interference of the non-priority device 150 with priority device(s) 140 when using the special access frequency band of the wireless communication network 160.

The governing instruction may also be generated with system controller 118 via reference to data previously provided by regulatory agencies and/or third parties, without the active involvement of such entities.

At process P5, the non-priority device 150 determines whether it is capable of following the requirements of the governing instruction it received. If the non-priority device 150 is not capable of following the requirements of the governing instruction (N at process P5), flow passes to process P3 and access to the special access frequency band of the wireless communication network 160 is denied. If the non-priority device 150 is capable of following the requirements of the governing instruction (Y at process P5), access to the special access frequency band of the wireless communication network 160 is granted at process P6. Flow then passes back to process P5.

Communication by the non-priority device 150 via the special access frequency band of the wireless communication network 160 may thereafter require continuous compliance with the governing instruction (or an updated governing instruction). To that extent, the compliance of the non-priority device 150 with the governing instruction is continuously evaluated at process P5. For example, if the non-priority device 150 continues to comply with the governing instruction (Y at process P5), access to the special access frequency band of the wireless communication band 160 is again (e.g., continues to be) granted at process P6. If, however, the non-priority device 150 fails to continuously comply with the governing instruction for whatever reason, the DSAS 110 and/or priority device(s) 140 may deny further access to the special access frequency band of the wireless communication network 160 (N at process P5). In this case, flow passes to process P3 and access to the special access frequency band of the wireless communication network 160 is denied.

The operational methodology described herein may be implemented via the DSAS 110 and/or priority device(s) 140. In some cases, a non-priority device 150 may communicate directly with priority device(s) 140, which admits or denies access to the non-priority device 150, without partial reliance or any reliance on third-party intermediaries. In this manner, embodiments of the disclosure may provide decentralized management and governance in a wireless communication network 160 even when regulatory bodies and/or third parties associated with the network are not capable of providing continuous enforcement of such policies.

Computing device 200 may comprise any general purpose computing article of manufacture for executing computer program code installed by a user (e.g., a personal computer, server, handheld device, etc.). However, it is understood that computing device 200 is only representative of various possible equivalent computing devices that may perform the various process steps of the disclosure. To this extent, in other embodiments, computing device 200 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 200 may include a program product stored on a computer readable storage device, which can be operative to process requests by non-priority device(s) 150 to operate on a special access frequency band of a wireless communications network 160.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A method for admitting devices to a frequency band of a wireless communication network, the method comprising:
   detecting an access request to communicate via the wireless communication network, the wireless communication network including at least one priority device communicating via the frequency band of the wireless communication network, wherein the access request is generated by a non-priority device;
   evaluating whether a portion of the frequency band of the wireless communication network is available for use by the non-priority device, based on communication settings of the non-priority device;
   transmitting a governing instruction to the non-priority device in response to the portion of the frequency band of the wireless communication network being available for use by the non-priority device; and
   denying the access request in response to the portion of the frequency band of the wireless communication network not being available for use by the non-priority device,
   wherein the at least one priority device of the wireless communication network implements the evaluating, the transmitting, and the denying in real time.

2. The method of claim 1, further comprising:
   determining if the non-priority device is capable of following the governing instruction;
   denying the access request if the non-priority device is not capable of following the governing instruction; and
   granting the access request if the non-priority device is capable of following the governing instruction.

3. The method of claim 1, further comprising:
   continuously determining if the non-priority device is capable of following the governing instruction; and
   denying the access request if the non-priority device is not capable of continuously following the governing instruction.

4. The method of claim 3, wherein the detecting includes the at least one priority device wirelessly receiving the access request from the non-priority device via an access network independent from the wireless communication network.

5. The method of claim 1, wherein a spectrum access system (SAS) of the wireless communication network also implements the evaluating, the transmitting, and the denying in real time.

6. The method of claim 1, further comprising:
   obtaining regulatory data from a regulatory level of the wireless communication network;
   storing the regulatory data; and
   generating the governing instruction based at least partially on the stored regulatory data.

7. The method of claim 1, wherein the non-priority device directly communicates with each of the at least one priority device.

8. The method of claim 1, further comprising propagating a ledger of past access requests to each of the at least one priority device.

9. The method of claim 1, further comprising distributing metadata related to the wireless communication network to each of the at least one priority device and the non-priority device.

10. The method of claim 9, further comprising storing the metadata in a blockchain in each of the at least one priority device and the non-priority device.

11. The method of claim 9, wherein the metadata includes at least one of available frequencies in the wireless communication network, power consumption characteristics, signal modulation, packet overhead, and other waveform properties.

12. The method of claim 9, wherein the metadata includes at least one of temporal, spectral, and security characteristics of the wireless communication network.

13. The method of claim 9, wherein the metadata includes regulatory data from a regulatory level of the wireless communication network.

14. The method of claim 13, further comprising:
receiving changes to the regulatory data from the regulatory level of the wireless communication network; and
pushing the changes to the regulatory data to each of the at least one priority device and the non-priority device.

15. A system comprising:
at least one priority device configured to communicate via a frequency band of a wireless communication network;
a network controller communicatively coupled to the at least one priority device, wherein the network controller is configured to:
detect an access request to communicate via the wireless communication network, wherein the access request is generated by a non-priority device;
evaluate whether a portion of the frequency band of the wireless communication network is available for use by the non-priority device, based on communication settings of the non-priority device;
transmit a governing instruction to the non-priority device in response to the portion of the frequency band of the wireless communication network being available for use by the non-priority device; and
deny the access request in response to the portion of the frequency band of the wireless communication network not being available for use by the non-priority device,
wherein the network controller is a subcomponent of the at least one priority device.

16. The system of claim 15, wherein the network controller is configured to detect the access request without monitoring the frequency band of the wireless communication network.

17. The system of claim 15, wherein the network controller is further configured to:
continuously determine if the non-priority device is capable of following the governing instruction; and
deny the access request if the non-priority device is not capable of continuously following the governing instruction.

18. The system of claim 15, wherein the network controller is further configured to:
obtain regulatory data from a regulatory level of the wireless communication network;
store the regulatory data; and
generate the governing instruction based at least partially on the stored regulatory data.

19. A method for decentralized governance of a frequency band of a wireless communication network, the method comprising:
detecting, via at least one priority device included within a non-regulatory level of the wireless communication network, an access request to communicate via the frequency band of the wireless communication network, wherein the access request is generated by a non-priority device lacking authorization in a regulatory level of the wireless communication network;
evaluating, via the at least one priority device, whether a portion of the frequency band of the wireless communication network is available for use by the non-priority device, based on communication settings of the non-priority device;
transmitting a governing instruction to the non-priority device in response to the portion of the frequency band of the wireless communication network being available for use by the non-priority device, wherein the governing instruction is not generated by the regulatory level of the wireless communication network;
denying the access request, via the at least one priority device, in response to the portion of the frequency band of the wireless communication network not being available for use by the non-priority device; and
requesting, via the at least one priority device, verification of the governing instruction concurrently with the non-priority device operating on the network via the portion of the frequency band.

20. The method of claim 19, further comprising generating the governing instruction based at least partially on regulatory data originating from the regulatory level of the wireless communication network.

21. The method of claim 19, further comprising repeating the evaluating, and either the transmitting or the denying, concurrently with the non-priority device operating on the network via the portion of the frequency band.

22. The method of claim 19, wherein the at least one priority device includes one of a spectrum analysis system (SAS) of the wireless communication network or a priority device having prior authorization to communicate via the frequency band of the wireless communication network.

23. The method of claim 19, wherein the at least one priority device is configured to detect the access request without monitoring the frequency band of the wireless communication network.

* * * * *